Oct. 13, 1964 R. H. DOYLE 3,152,519
FASTENER DRIVING APPARATUS
Filed June 26, 1961 2 Sheets-Sheet 1
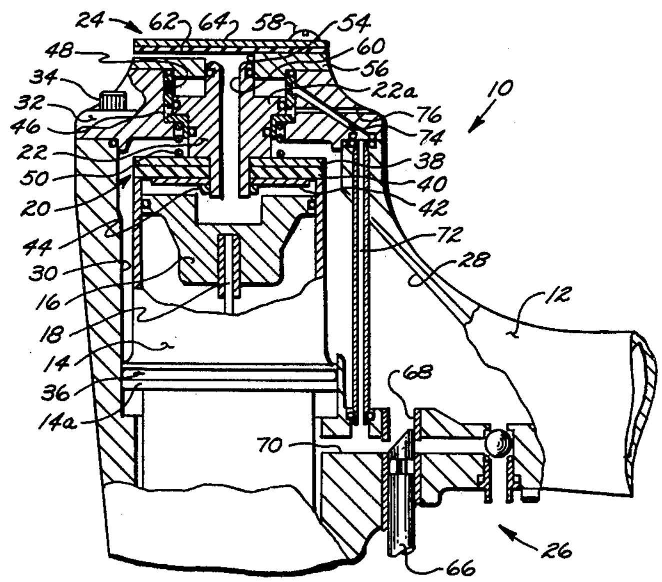
Fig-1-
Fig-2-
INVENTOR.
Richard H. Doyle
BY
Mason, Kolehmainen
Rathburn & Wyss
Atty's.

FASTENER DRIVING APPARATUS
Filed June 26, 1961 2 Sheets-Sheet 2
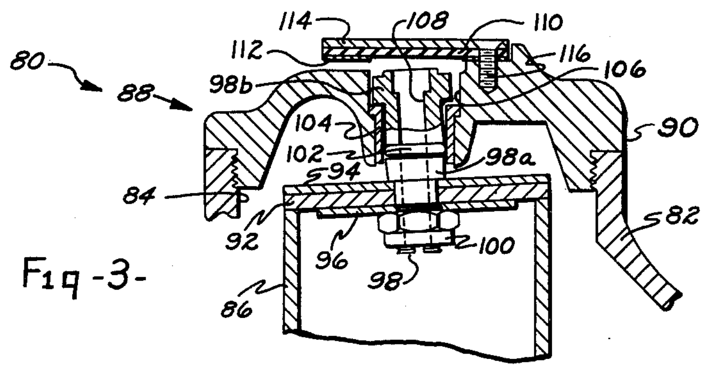
Fig-3-
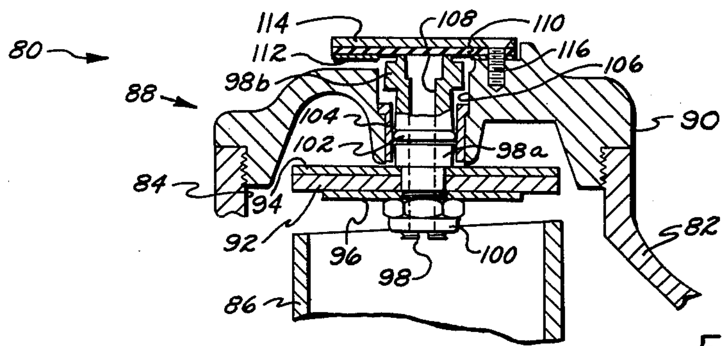
Fig-4-
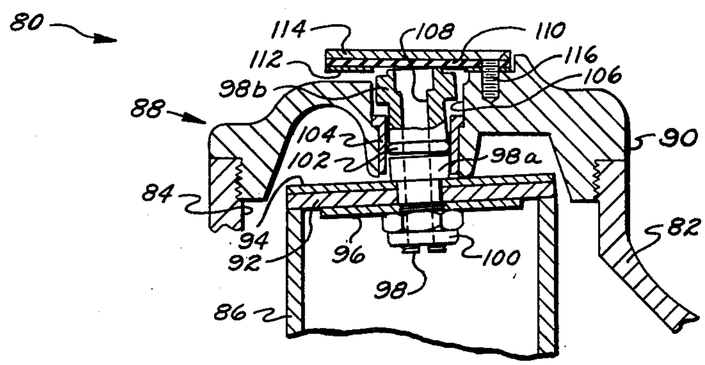
Fig-5-
INVENTOR.
Richard H. Doyle
BY
Mason, Kolehmainen,
Rathburn + Wyss.
Atty's:

United States Patent Office 3,152,519

Patented Oct. 13, 1964

3,152,519
FASTENER DRIVING APPARATUS

Richard H. Doyle, Mount Prospect, Ill., assignor to Fastener Corporation, Chicago, Ill., a corporation of Illinois Filed June 26, 1961, Ser. No. 119,536
3 Claims. (Cl. 91—423)

This invention relates to a fastener driving apparatus and more particularly, to a fastener driving apparatus including new and improved means for controlling the flow of a pressure fluid into and out of a cylinder.

Pneumatically operated tools for driving fasteners, such as staples, brads or nails, into workpieces have attained extensive commercial acceptance. These tools are now being used in such varied fields as furniture and automobile manufacturing and certain fabricating operations in the construction of buildings. As the use of the tools extends to different fields in which it is necessary to drive longer fasteners, such as three-inch nails, into harder materials, it is often necessary to increase the pressure of the compressed air in order to obtain adequate penetration of the workpiece. Many of the tools in which these increased air pressures are being used are of the different types shown in Golding et al. Patent No. 2,872,901 or Wandel et al. Patent No. 2,979,725.

In these types of devices, a fastener driver is actuated by a piston slidably mounted in a cylinder. This cylinder is positioned adjacent a large body of compressed air, and a valve element seated on an open upper end of the cylinder normally prevents the flow of compressed air from the adjacent body into the cylinder. The tools are operated by control means that separate the cylinder and the valve element to admit air for driving the piston downwardly and then close these elements when the power or driving stroke is completed. In order to permit the piston to be returned to a normal position by pneumatic or resilient means after the closure of the cylinder, the control means vents the air entrapped in the upper end of the cylinder to the atmosphere. When the increased air pressures needed for driving longer fasteners are used, it is sometimes difficult to provide satisfactory reclosure of the cylinder and venting of the trapped air with the control means previously used without adversely affecting the instantaneous separation of the valve element and the cylinder required to provide the large area opening for supplying compressed air at full pressure to the cylinder.

Accordingly, one subject of the present invention is to provide a fastener driving apparatus including new and improved means for controlling the flow of a pressure fluid into and out of the open end of a cylinder.

Another object is to provide a fastener driving apparatus including separate piston means for positively moving both a cylinder and a valve element into and out of sealing engagement.

A further object is to provide a fastener driving apparatus including new and improved means for controlling the venting of the upper end of a cylinder.

Another object is to provide a fastener driving apparatus including a pivotally and slidable mounted valve assembly for controlling the admission of air to and exhaustion of air from a cylinder.

Another object is to provide a fastener driving apparatus including control means for providing positive separation and reclosure of a cylinder and valve element even when high pressure fluids are used.

In accordance with these and many other objects, a first embodiment of the invention comprises a pneumatically actuated stapler or fastener driving device having a housing forming a first chamber in which a cylinder is slidably mounted. A drive piston slidably mounted in the cylinder is secured to a driver blade so that when the piston is moved downwardly, the lower end of the blade engages and drives fasteners supplied by a suitable fastener magazine. The chamber is supplied with a large body of compressed air that is normally prevented from flowing into the open upper end of the cylinder by a valve element that seats on the upper edge of the cylinder. The valve element is secured to a control piston that is slidably mounted in a second chamber formed in the housing above the first chamber. This control piston includes an axially extending passageway for placing the upper end of the cylinder into communication with the atmosphere and provides an exhaust valve assembly that is selectively opened and closed by moving the upper end of the portion of the control piston defining the passageway into and out of engagement with a resilient valve seat carried on the housing.

In the normal condition of the tacker, the control valve assembly supplies compressed air to an area disposed beneath a flange forming a piston on the movably mounted cylinder and to the upper surface of the control piston so that the valve element and cylinder are pneumatically urged into seating engagement. When the fastener driving tool is to be operated, the control valve assembly is actuated to connect the second chamber and the portion of the first chamber disposed beneath the flange on the cylinder to the atmosphere so that the compressed air in the chamber drives the cylinder downwardly and acts on the lower surface of the valve element to drive the valve element and control piston upwardly. This provides an instantaneous large area opening at the upper end of the cylinder through which the compressed air in the first chamber flows into the interior of the cylinder to move the drive piston downwardly so that the fastener driving blade engages and sets a fastener.

When the control piston moves upwardly, the upper end thereof seats on the resilient valve element to close the exhaust passageway and prevent the loss of compressed air from the first chamber.

When the control valve assembly is released, compressed air is again supplied to the first chamber beneath the piston defining flange on the cylinder and the upper end of the second chamber. This compressed air forces the control piston and valve element downwardly and the cylinder upwardly so that the valve element and the upper end of the cylinder are again pneumatically urged into a seating relationship to close off communication between the interior of the upper end of the cylinder and the surrounding portion of the first chamber. When the control piston moves downwardly, the upper end thereof is moved out of engagement with the resilient valve seat to open the exhaust passageway so that the compressed air in the upper end of the cylinder is exhausted to the atmosphere. This permits the drive piston to be returned by suitable pneumatic or resilient piston return means. Accordingly, the provision of piston means on both the movable cylinder and the movable valve element permits these components to be positively moved into and out of engagement to provide an instantaneous large area opening while retaining both a positive closing movement of the cylinder and valve element and a positive control over the opening and closing of the exhaust valve assembly.

In a second embodiment of the invention, the pneumatically actuated fastener driving device is provided with a housing forming a chamber in which a cylinder including a piston portion is movably mounted. A piston slidably mounted within the cylinder is secured to the upper end of a fastener driving blade, the lower end of which is adapted to engage and set fasteners supplied from a suitable magazine. The chamber is supplied with a body of compressed air surrounding the cylinder, and a valve element normally engages the upper end of the cylinder to close off communication between the chamber and the interior of the cylinder. The valve element is secured to a support member having an axially extending passageway that normally places the interior of the cylinder in communication with the atmosphere. The support member is mounted on the housing for sliding and pivoting or tilting movement and includes an upper end that is spaced from a resilient valve seat carried on the housing.

In the normal condition of the fastener driving tool, compressed air is supplied to the lower surface of the piston so that the cylinder is held in engagement with the valve element. The valve element and support member are urged downwardly by the pressure differential across the valve element due to the compressed air acting on its upper surface and the evacuated state of the cylinder. When the tool is to be operated, the lower surface of the piston portion of the cylinder is connected to the atmosphere by actuating a control valve assembly so that the piston moves downwardly away from the valve element. When compressed air is admitted to the upper end of the cylinder, the piston is driven downwardly to actuate the fastener driving blade and the compressed air acting on the lower surface of the valve element moves this valve element and the support member upwardly so that the upper end of the support member engages the resilient valve seat to close the exhaust passageway.

When the control valve assembly is released, compressed air is again supplied to the lower surface of the piston portion on the cylinder, and the cylinder is driven upwardly to engage the valve seat which is now in its displaced condition. The upper edge of the cylinder is formed with an inclined or tapered edge so that when the cylinder engages the valve element, the valve element and the support member are pivoted or tipped by a positive application of force. When the support member is tipped, the upper end of the support member is at least partially moved out of engagement with the valve seat to open the exhaust passageway. This permits the compressed air in the upper end of the cylinder to be exhausted to the atmosphere so that the drive piston can be returned to its normal position by suitable pneumatic or resilient piston return means. Further, when the compressed air is exhausted from the upper end of the cylinder a force differential is produced across the valve element which moves the cylinder and valve element downwardly to their normal positions. In moving downwardly, the upper end of the support member is moved away from the resilient valve seat to maintain the exhaust valve in an open condition.

Many other objects and advantages of the present invention will become apparent from considering the following detailed description in conjunction with the drawings in which:

FIG. 1 is a fragmentary sectional view of a pneumatically operated fastener driving tool which embodies the present invention and which is shown in a normal condition;

FIG. 2 is a fragmentary sectional view similar to FIG. 1 illustrating the fastener driving tool in an actuated condition;

FIG. 3 is a fragmentary sectional view of a closure and exhaust valve assembly for a cylinder of a fastener driving tool which forms a second embodiment of the invention and which is shown in a normal position;

FIG. 4 is a fragmentary sectional view similar to FIG. 3 showing the closure and exhaust valve assembly in an operated condition; and FIG. 5 is a fragmentary sectional view similar to FIGS. 3 and 4 illustrating the closure and exhaust valve assembly in a position following the release of the fastener driving apparatus and prior to its return to a normal condition.

Referring now more specifically to FIGS. 1 and 2 of the drawings, therein is illustrated a pneumatically operated fastener driving machine, indicated generally as 10, which embodies the present invention and which includes a housing 12 in which a cylinder 14 is slidably mounted. The cylinder 14 contains a drive piston 16 secured to the upper end of a fastener driving blade 18, the lower end of which is adapted to engage and set fasteners supplied by a suitable magazine construction (not shown) when the piston 16 is moved downwardly. The upper end of the cylinder 14 is normally closed by a main valve assembly 20 that is secured to a control piston means 22. The control piston 22 forms a part of an exhaust valve assembly 24 for selectively connecting the upper end of the interior of the cylinder 14 to the atmosphere.

When the fastener driving apparatus 10 is to be actuated, a control valve means, indicated generally as 26, is actuated to cause the cylinder 14 to move downwardly and the control piston 22 to move upwardly. This produces an instantaneous separation of the upper end of the cylinder 14 and the main valve assembly 20 so that a large area opening is provided for admitting compressed air to the interior of the cylinder 14. When the piston 22 moves upwardly, the exhaust valve assembly 24 is closed. The compressed air admitted to the open upper end of the cylinder 14 drives the piston 16 downwardly so that the blade 18 engages and sets a staple. When the control valve assembly 26 is released, the cylinder 14 is pneumatically biased upwardly and the control piston 22 is pneumatically biased downwardly so that the main valve assembly 20 again seats on the upper edge of the cylinder 14 to close off communication between the body of compressed air and the interior of the cylinder 14. Further, when the piston means 22 moves downwardly, the exhaust valve assembly 24 is opened to exhaust the compressed air entrapped in the upper end of the cylinder 14 to permit the piston 16 to be returned by suitable pneumatic or resilient piston return means. Thus, the fastener driving tool 10 includes pneumatically actuated means for positively moving the cylinder 14 and the main valve assembly 20 during opening and closing movements to provide a fastener driving apparatus capable of satisfactory operation at the high pressures used in driving fasteners of great length into hard workpieces.

The fastener driving tool 10 is of the same general type as that shown and described in detail in the above identified Wandel et al. patent in which the housing 12 is provided with a hollow handle defining a compressed air reservoir 28 and a chamber 30 that is closed at its open upper end by a closure cap 32. The closure cap 32 is secured to the housing 12 by a plurality of fasteners 34. The tool 10 includes a suitable magazine assembly (not shown) for feeding fasteners, such as brads or staples, to a drive track in which the lower end of the blade 18 is slidably received. Although the device 10 can be provided with the usual pneumatic or resilient means for returning the piston 16 to its normal position (FIG. 1), the above identified Wandel et al. patent discloses a pneumatic means for returning the piston 16.

The cylinder 14 is disposed in the chamber 30 and includes a flanged portion **14*a* carrying a resilient O-ring 36. The flanged portion 14*a* and the O-ring 36 provides a piston portion that is slidably received in a lower cylindrical part 30*a* of the chamber 30 to provide means for moving the cylinder 14. The cylinder 14 normally is held in the position shown in FIG. 1 by the compressed air supplied from the reservoir 28 through the control valve assembly 26 to the greater effective area of the cylinder 14 disposed beneath the flange 14*a*. The cylinder 14 is moved to the lowered position shown in FIG. 2 by connecting the portion 30*a* of the chamber 30 to the atmosphere under the control of the control valve assembly 26**.

The main valve assembly 20 for selectively closing the open upper end of the cylinder 14 comprises a plate 38, a resilient element 40 and a smaller diameter plate 42 that are secured to the lower end of the control piston 22 by a nut 44. To provide means for shifting the position of the main valve assembly 20, a flanged portion 22*a* of the control piston 22 is slidably mounted within a large diameter portion of a shouldered insert 46 that is disposed within an opening or chamber 48 in the upper end of the closure cap 32. A compression spring 50, which bears against the upper surface of the plate 38 at its lower end and which is received within an annular groove formed between the shouldered portion of the insert 46 and the lower end of the opening 48 in the closure cap 32, biases the main valve assembly 20 to the position shown in FIG. 1. This insures the closure of the cylinder 14 to prevent an indavertent operation of the tool 10 when it is initially connected to a supply of compressed air. The upper end of the piston means 22 is slidably mounted in an opening 54 formed in a plate 56 which closes the upper end of the opening 48 and which is secured to the closure cap 32 by one or a plurality of fasteners 58.

The exhaust valve assembly 24 includes a passage 60 that extends from the interior of the cylinder 14 to the atmosphere. A resilient valve seat 62 backed by a rigid plate 64 is secured to the upper surface of the plate 56 by the fasteners 58 to provide means for selectively sealing the upper end of the exhaust passage 60. The exhaust valve assembly 24 is shown in an open position in FIG. 1 and in a closed position in FIG. 2.

The control valve assembly 26 provides means for selectively supplying compressed air to and exhausting compressed air from portions of the chambers 30 and 48 to control the separation and reclosure of the cylinder 14 and the main valve assembly 20. The control valve assembly 26 is identical to the similar valve means shown and described in detail in the above identified Wandel et al. patent. More specifically, the valve assembly 26 includes a rod 66 which is slidably mounted in an opening 68 in the housing 12 and which normally occupies the position shown in FIG. 1. In this position, compressed air from the reservoir 28 flows through the upper portion of the opening 68 and a passage 70 to be supplied to the lower surface of the flanged or piston portion 14*a* on the cylinder 14. The compressed air acts on the effective area of the cylinder 14 disposed below the flanged portion 14*a*, which area is greater than the effective area of the cylinder 14 disposed above the flanged portion 14*a*, to provide an upwardly directed component of force for holding the cylinder 14 in the normal position shown in FIG. 1. The compressed air in the passage 70 also flows through a conduit 72 and a passageway 74 in the closure cap 32 to be supplied to the upper end of the chamber 48. This compressed air acts on the upper surface of the control piston 22 to resiliently bias the main valve assembly 20 downwardly into engagement with the upper edge of the cylinder 14. The lower portion of the chamber 48 is connected to the atmosphere by a passage 76 that is formed in the closure cap 32.

When the stapler or fastener driving tool 10 is to be actuated, the shaft 66 is moved upwardly by placing the nose of the driving device 10 in engagement with a workpiece. In its elevated position (FIG. 2), a notched portion 66*a* in the rod 66 places the passage 70 in communication with an additional passage 77 that terminates in a bore 78 in which a ball valve element 79 is freely mounted. The compressed air in the reservoir 28 normally biases the ball valve 79 downwardly to the position shown in FIG. 1 so that compressed air is supplied to the passage 70 through the passage 77 and the notched portion 66*a*. However, when a trigger actuating assembly such as that shown in the above identified Wandel et al. patent is actuated, the ball valve 79 is moved upwardly to engage a reduced diameter portion of the bore 78 so as to close off communication between the passage 77 and the compressed air in the reservoir 28. This movement of the ball valve 79 also connects the passageway 77 to the atmosphere through the lower portion of the bore 78 so that the compressed air in the upper portion of the chamber 48 and the chamber portion 30*a* is exhausted to the atmosphere.

When the compressed air is exhausted from the chamber portion 30*a*, the compressed air acting on the effective upper surfaces of the cylinder 14 moves this cylinder downwardly to the position shown in FIG. 2 so that the main valve assembly 20 is separated from the upper edge of this cylinder. This permits compressed air from the reservoir 28 and the chamber 30 to flow into the upper end of the cylinder 14 and drive the piston 16 and the driver blade 18 downwardly. This compressed air also acts on the greater effective area of the main valve assembly 20 disposed within the chamber 30 so that the control piston 22 is driven upwardly to the position shown in FIG. 2. In this position, the upper end of the control piston 22 seats on the resilient valve element 62 to seal off communication through the passageway 60 to the atmosphere. Thus, the exhaust valve assembly 24 is closed to prevent the loss of compressed air from the chamber 30.

When either the ball valve element 79 or the rod 66 is restored to the normal position shown in FIG. 1, the connection between the atmosphere and both the upper portion of the chamber 48 and the lower portion of the chamber 30 is terminated and compressed air is supplied thereto. The compressed air supplied to the area of the chamber 30 below the piston portion 14*a* moves the cylinder 14 upwardly, and the compressed air supplied to the upper portion of the chamber 48 moves the control piston 22 downwardly. As a result of this movement, the upper edge of the cylinder 14 is pneumatically biased into engagement with the resilient valve element 40 in the main valve assembly 20 to close off communication between the compressed air in the chamber 30 and the interior of the cylinder 14. Further, when the piston 22 is moved downwardly to the position shown in FIG. 1, the upper end of the control piston 22 moves out of engagement with the resilient valve seat 62 to open the passageway 60. Thus, the compressed air entrapped in the upper end of the cylinder 14 is exhausted to the atmosphere through the passageway 60, and the resilient or pneumatic piston return means provided in the stapler 10 is rendered effective to restore the piston 16 and the driver blades 18 to their normal positions (FIG. 1).

Accordingly, the pneumatically operated stapler 10 includes pneumatically operated means by which the opening and closing movements of both the main valve assembly 20 and the cylinder 14 are positively controlled by the actuation of the control valve assembly 26. This means for controlling the flow of compressed air into and out of the cylinder 14 and including the exhaust valve assembly 24 is capable of use with high pressure compressed air in a range much higher than previously possible.

A second pneumatic stapler, indicated generally as 80, that embodies the present invention is shown in FIGS. 3–5 of the drawings. The stapler 80 is of the same general construction as the pneumatic tool 10 and includes a housing 82 defining a chamber 84 supplied with a body of compressed air from a compressed air reservoir in a hollow handle (not shown) of the housing 82. A cylinder 86 is movably mounted in the chamber 84 and contains a piston actuated fastener driving means similar to the piston 16 and the blade 18. The open upper end of the cylinder 16 is selectively placed in communication with the compressed air in the chamber 84 by selectively moving the cylinder 86 into and out of engagement with the closure and main valve assembly, indicated generally as 88, under the control of a control valve assembly similar to the assembly 26. The cylinder 86 is identical to the cylinder 14 except that the upper end of the cylinder 86 is formed with a bias, taper or inclination to provide means for actuating the assembly 88. The closure and exhaust valve assembly 88 is mounted on a cap structure 90 that closes the open upper end of the chamber 84.

The main valve included in the assembly 88 comprises a resilient valve element 92 disposed between an upper plate 94 and a smaller diameter lower plate 96. The elements 92, 94 and 96 are clamped against a shoulder formed on a support member 98 by a lock nut 100. In the normal or released condition of the tool 80, the biased or inclined upper edge of the cylinder 86 engages the peripheral portion of the resilient element 92 to seal off communication between the interior of the cylinder 86 and the chamber 84.

The support member 98 is mounted on or carried by the closure cap 90 for sliding and pivoting or tilting movement relative thereto. More specifically, a central portion 98*a* of the support member 98 is formed with oppositely tapered surfaces and supports a resilient O-ring 102 that is slidably mounted within a sleeve 104 which is disposed within a central opening 106 in the cap 90. A shoulder 98*b* on the upper end of the support member 98 engages the upper end of the sleeve 104 to limit downward movement of the support member 98.

To provide means for exhausting compressed air from the upper end of the cylinder 86, the support member 98 is provided with an axially extending passageway 108 that communicates with the atmosphere when the assembly 88 is in the normal position shown in FIG. 3. A resilient valve seat 110 disposed between a lower washer or ring 112 and an upper plate 114 provides means for closing the passageway 108 when the support member 98 is moved to the position shown in FIG. 4. The elements 110, 112, 114 are secured to the upper surface of the closure cap 90 by one or more fasteners 116.

When the pneumatic tool 80 is to be operated, a control valve similar to the control valve assembly 26 is operated to cause the cylinder 86 to move downwardly to the position shown in FIG. 4. This admits compressed air to the upper end of this cylinder so that the piston and driver blade are driven downwardly in a power stroke. When the cylinder 86 moves downwardly, compressed air acts on the lower surface of the support member 98, the upper surface of which is exposed to the atmosphere, so that the support member 98 is moved upwardly to the position shown in FIG. 4 in which the upper end of this member engages the resilient element 110 to close the passageway 108. This closes the exhaust valve means so that compressed air from the chamber 84 is not discharged to the atmosphere. In this condition, the main valve including the elements 92, 94 and 96 is disposed in a substantially horizontal position.

When the control valve, such as the valve assembly 26, is released, compressed air acts on the piston portion on the cylinder 86 to move this cylinder upwardly to the position shown in FIG. 5. When the inclined or biased upper end of the cylinder 86 engages the resilient valve element 92, communication between the chamber 84 and the interior of the cylinder 86 is cut off. In addition, the inclination of the upper edge of the cylinder 86 tips the elements 92, 94 and 96 and the support member 98 to the position shown in FIG. 5 so that at least a portion of the upper end of the support 98 is displaced or pivoted out of engagement with the resilient valve element 110. This opens the passage 108 so that the compressed air entrapped in the upper end of the cylinder 86 is discharged to the atmosphere to permit the drive piston to be returned to its normal position. In addition, the exhaustion of the compressed air from the interior of the cylinder 86 produces a pressure differential across the elements 92, 94 and 96 to provide a downwardly directed component of force due to the compressed air acting on the upper surface of the plate 94. This moves the support member 98 and the elements secured thereto downwardly to the normal position shown in FIG. 3.

Thus, the slidably and pivotally mounted support 98 for the main valve assembly 88 and the biased upper end of the cylinder 86 provide means for positively operating the exhaust valve means for discharging compressed air from the upper end of the cylinder 86 at the termination of the power stroke.

Although the present invention has been described with reference to two illustrative embodiments thereof, numerous other modifications and embodiments can be devised by those skilled in the art that will fall within the spirit and scope of the principles of this invention.

What is claimed and desired to be secured by Letters Patent of the United States is:

1. A fastener driving device comprising a housing defining first and second spaced chambers, cylinder means movably mounted in said first chamber and including a piston portion slidably engaging the wall of said first chamber to divide said first chamber into upper and lower parts, the upper part of said first chamber being supplied with a body of compressed air, fastener driving means including a piston slidably mounted in said cylinder means, valve means for engaging the upper end of said cylinder means to control communication between the upper part of said first chamber and the interior of said cylinder means, said valve means including a piston means slidably mounted in said second chamber, means defining a first passageway communicating with said lower part of said first chamber, means defining a second passageway communicating with said second chamber, and a control valve assembly for selectively connecting said first and second passageways to a source of compressed air and to the atmosphere.

2. A fastener driving device comprising a housing defining first and second spaced chambers, cylinder means movably mounted in said first chamber and including a piston portion slidably engaging the wall of said first chamber to divide said first chamber into upper and lower parts, the upper part of said first chamber being supplied with a body of compressed air, fastener driving means including a piston slidably mounted in said cylinder means, valve means for engaging the upper end of said cylinder means to control communication between the upper part of said first chamber and the interior of said cylinder means, said valve means including a piston means slidably mounted in said second chamber, and a control valve assembly for selectively supplying compressed air to and exhausting compressed air from said second chamber and the lower part of said first chamber to move said cylinder means and said valve means relative to each other, said control valve assembly having a normal setting in which the compressed air in said first and second chambers biases said valve means and said cylinder means toward each other so that said valve means prevents communication between the interior of said cylinder means and the upper part of said first chamber, said control valve assembly also having an operated setting in which the compressed air forces both of said cylinder means and said valve means away from each other so that the upper end of said cylinder means is opened to admit compressed air from the upper part of said first chamber into said cylinder to drive said piston.

3. A fastener driving device comprising a housing defining first and second spaced chambers, cylinder means movably mounted in said first chamber and including a piston portion slidably engaging the wall of said first chamber to divide said first chamber into upper and lower parts, the upper part of said first chamber being supplied with a body of compressed air, fastener driving means including a piston slidably mounted in said cylinder means, valve means for engaging the upper end of said cylinder means to control communication between the upper part of said first chamber and the interior of said cylinder means, said valve means including a piston means slidably mounted in said second chamber, means defining a first passageway communicating with said lower part of said first chamber, means defining a second passageway communicating with said second chamber, means defining a third passageway extending to the atmosphere and communicating with said second chamber at a point spaced between said second passageway and said valve means, and a control valve assembly operable to supply compressed air to said first and second passageways so that the cylinder means is biased upwardly and the valve means is biased downwardly into sealing engagement to close off communication between the upper part of said first chamber and the interior of said cylinder means, said control valve assembly also being operable to connect said first and second passageways to the atmosphere so that the compressed air in said upper part of said first chamber biases said cylinder means downwardly and said valve means upwardly to open the upper end of said cylinder means.

References Cited in the file of this patent

UNITED STATES PATENTS

| | | |
|---|---|---|
| 2,872,901 | Goldring et al. | Feb. 10, 1959 |
| 2,960,067 | Osborne | Nov. 15, 1960 |
| 2,979,725 | Wandel | Apr. 18, 1961 |
| 3,010,430 | Allen et al. | Nov. 28, 1961 |
| 3,067,724 | Jenny et al. | Dec. 11, 1962 |